United States Patent [19]

Damerau

[11] 4,201,675
[45] May 6, 1980

[54] LIQUID FILTER WITH NOVEL SEAL MEANS

[76] Inventor: Herbert R. Damerau, 25321 Wykeshire, Farmington Hills, Mich. 48018

[21] Appl. No.: 969,461

[22] Filed: Dec. 14, 1978

[51] Int. Cl.² .............................................. B01D 33/12
[52] U.S. Cl. .................................... 210/387; 210/401; 210/416 R; 210/DIG. 3
[58] Field of Search .................. 162/348, 363; 34/162; 74/240, 241; 271/204–206, 275–277, 196, 197; 226/95; 210/387, 400, 401, DIG. 3, 251, 406, 416 R; 270/93

[56] References Cited

U.S. PATENT DOCUMENTS

| | | | |
|---|---|---|---|
| 2,664,203 | 12/1953 | Crane et al. | 210/387 |
| 2,983,383 | 5/1961 | Wallace et al. | 210/401 |
| 3,333,705 | 8/1967 | Lee | 210/251 |
| 3,552,098 | 1/1971 | Cochran | 210/387 |
| 3,581,896 | 6/1971 | Kuhlman | 210/387 |

*Primary Examiner*—Frank Sever
*Attorney, Agent, or Firm*—Burton, Parker & Schramm

[57] ABSTRACT

A liquid filter using a sheet of filter medium on a moveable conveyor where a contaminated liquid forms a pool above the conveyor and filter medium and is filtered therethrough into a filter compartment, contaminated liquid and filter being sealed from one another by a partial vacuum within the filter compartment pulling the filter medium against the conveyor in a sealed relationship with no other structures forming part of the seal.

2 Claims, 8 Drawing Figures

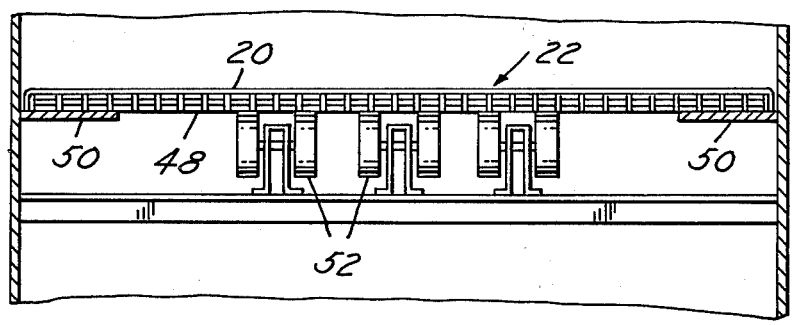
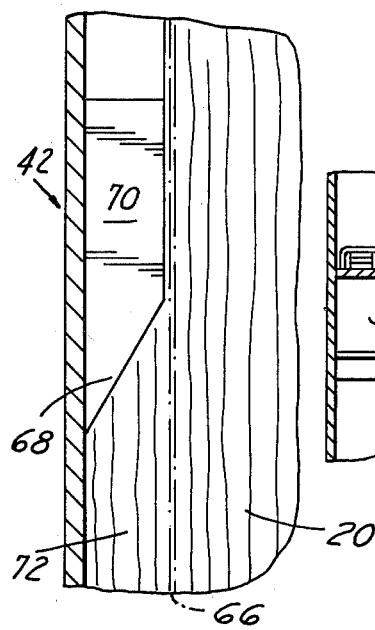
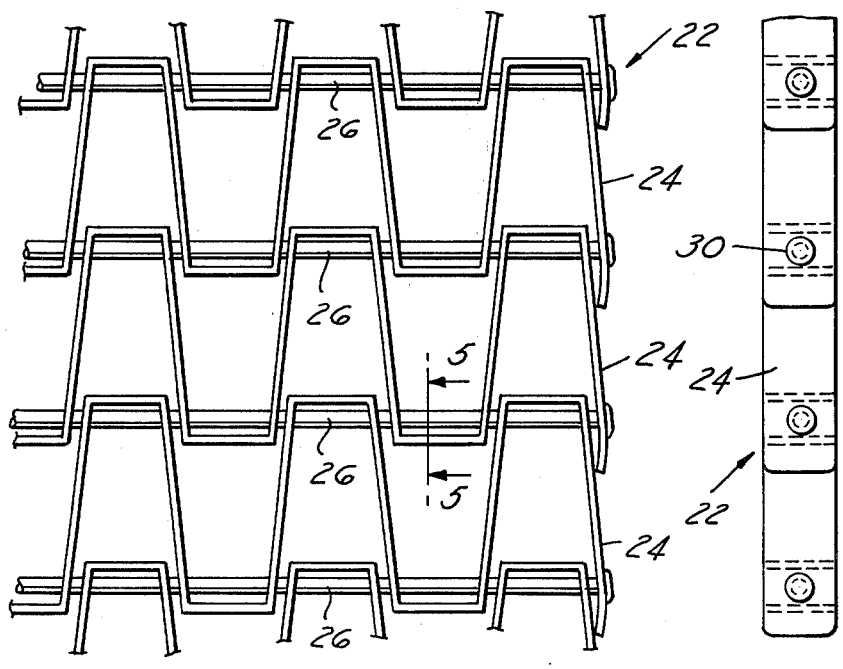
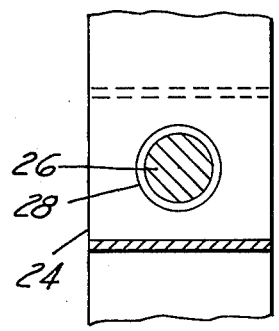

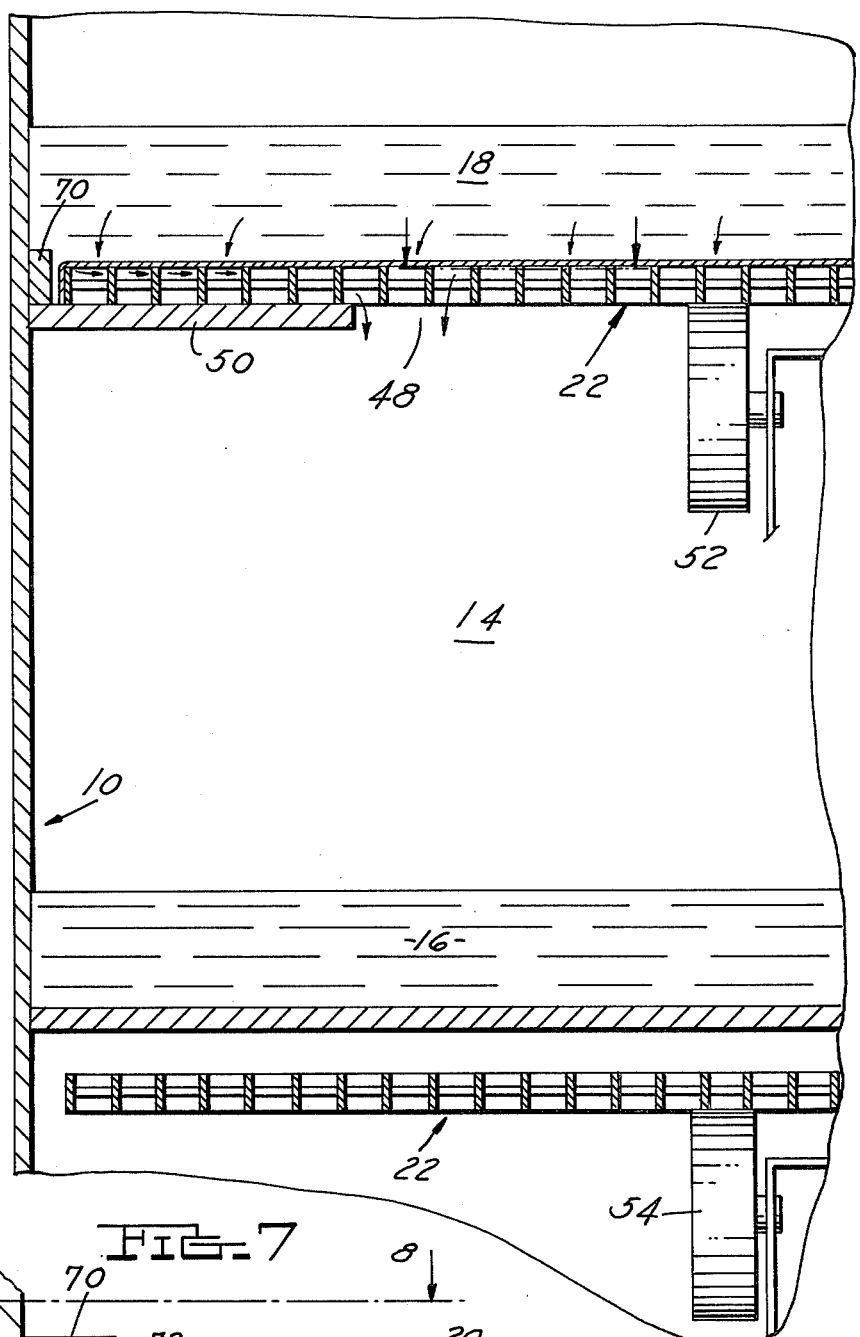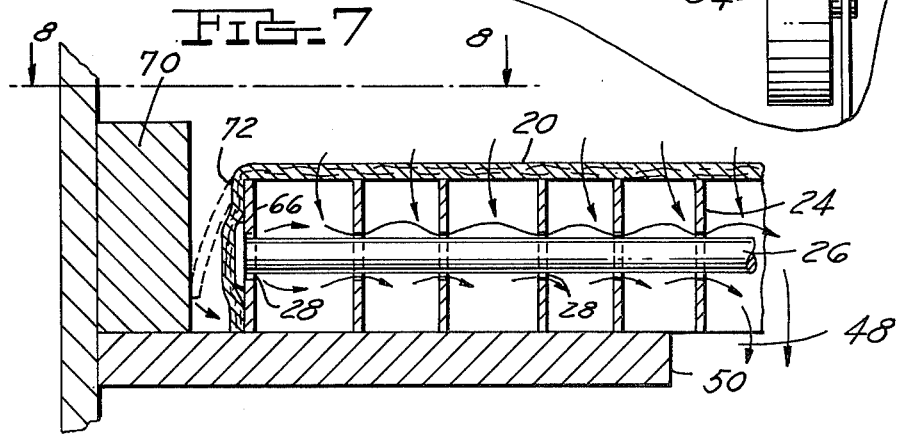

LIQUID FILTER WITH NOVEL SEAL MEANS

This invention relates to filters, and more particularly to improvements in filters of the type described and claimed in U.S. Pat. No. of Charles A. Wallace et al, 2,983,383, issued May 9, 1961.

Filters of this type mainly have a continuous conveyor which is driven intermittently in a fixed path around a container or tank into which filtered liquid is collected. A sheet of filter medium, such as porous paper or cloth, is fed onto the upper side of the conveyor for movement therewith and the conveyer is guided so to form a pool of contaminated liquid to be filtered at the top of the conveyor. The liquid is filtered by passing through the filter medium and then flows into the tank through the conveyor.

Such a filter was first shown in U.S. Pat. No. 2,983,383. There the conveyor moving the sheet of filter medium was an endless belt of woven material. When filtering liquid it is often necessary, or at least very desirable, to remove from it as nearly completely as possible the sludge and debris which is carried in the contaminated liquid yet when using a sheet of filter material there has always been the risk that the contaminated liquid will flow around the filter medium and enter the filtrate compartment. In U.S. Pat. No. 2,983,383, it was attempted to prevent the filtrate from becoming contaminated by having the filter medium sheet of a wider width than the conveyor and extending it up inclined side rails thus creating a trough for the contaminated liquid. However, it was found that this arrangement created various problems, among them distortion of the filter medium sheet during movement of the conveyor due to the friction between the sheet and the immovable side rails. Also, it was difficult to judge the correct width of the medium sheet needed. Use of too wide a sheet would result in the waste of filter medium paper while too narrow a sheet would risk allowing the filtered liquid to become contaminated.

The industry soon switched to the use of sealing strips made of resilient flexible material to engage the sheet of filter medium adjacent its edges to retain the flow of liquid on the conveyor such as described in U.S. Pat. No. 3,333,705. The industry soon after this also started using wire mesh belts in place of the woven material previously used. However, while filters of this construction operate quite satisfactorily, it is difficult to make the sealing strips absolutely leakproof. Another problem is created by using more effective filters, since to a certain extent the effectiveness of the sealing strips is proportionate to the pressure which can be applied between the sealing strip and the filter medium passing under it on the conveyor. This relationship results in the seals continuing to grip the sheet of filter medium during movement of the conveyor causing the medium to distort and sometimes tear. Also, when the filter media sheet width exceeds about six feet, I have found there is a tendency for the sheet to bunch up along the centerline of the conveyor with the margins pulling out from beneath the sealing strips.

SUMMARY OF THE INVENTION

I have discovered a method of making filters which does not require the use of sealing strips, but works by a partial vacuum created within the filtrate compartment and communicated under the conveyor. Although partial vacuums have been used in prior art, these have only been used to increase or help the flow of liquid through the conveyor and sheet of filter medium.

My invention has a conveyor which has a pool of contaminated liquid above it and which carries a sheet of filter medium through the contaminated liquid. This sheet of filter medium is held against the conveyor by a partial vacuum which is created in a compartment where the filtrate is collected and communicated through the conveyor. There are no structures holding this sheet of filter medium against the conveyor as it passes through the pool of contaminated liquid.

BRIEF DESCRIPTION OF THE DRAWINGS

FIG. 2 is a partial cross-section taken along line 2—2 in FIG. 1.

FIG. 3 is a top view of a flat wire belt.

FIG. 4 is a side view of the flat wire belt.

FIG. 5 is a view of the flat wire belt taken along line 5—5 of FIG. 3.

FIG. 6 is a partial cross-section of a liquid filter embodying applicant's invention and using a filter medium guide.

FIG. 7 is an enlargement of a portion of FIG. 7 showing applicant's invention.

FIG. 8 is a top view of a filter medium guide taken along line 8—8 in FIG. 7.

BRIEF DESCRIPTION OF PREFERRED EMBODIMENTS

Figure 1:
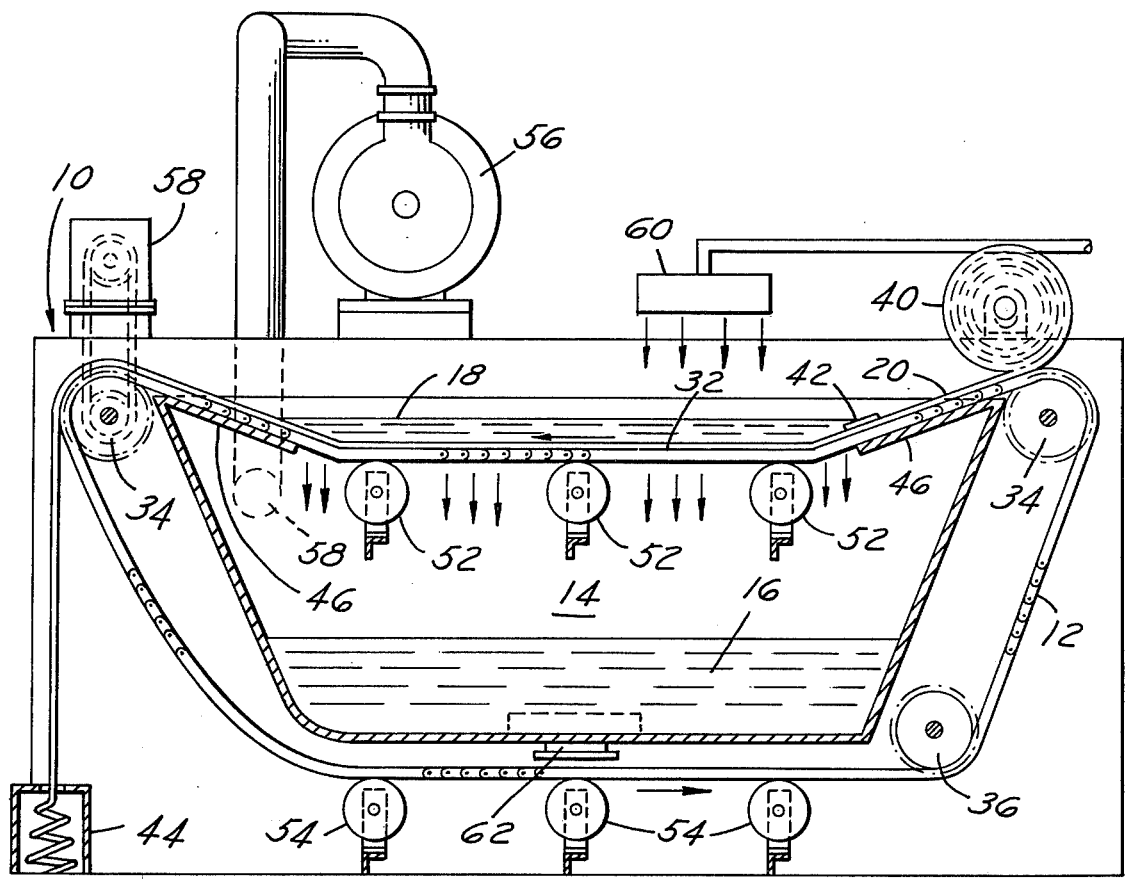
FIG. 1 is a side cross-sectional view of a liquid filter embodying applicant's invention.

The present invention involves an improvement in liquid filters, particularly of the type used for removing sludge particles and the like from liquid, especially coolant liquid used with machine tools. The filter 10 makes use of an endless conveyor 12 which moves around a central compartment 14 used for collecting the filtered liquid 16. The conveyor 12 during its upper run through a pool 18 of contaminated liquid supports a sheet of filter medium 20.

The endless conveyor 12 is made of a wire mesh 22, preferrably a flat wire belt, details of which are shown in FIGS. 3 through 5. The flat wire belt is comprised of numerous pieces of flat metal 24 interconnected in a wave pattern to form the belt. The flat metal pieces are joined by rods 26 passing through adjoining metal pieces. In the preferred embodiment the holes 28 for the rods are made oversize for a purpose to be described later. The ends of the rods will have a cap 30 that holds the rod in place.

The pool 18 of contaminated liquid, which may consist of coolant from machine tools with chips of metal from the workpieces entrailed, is formed in a slight depression along the upper run of the conveyor 12 between the upper gears 34 which help define the path of the conveyor together with the lower gear 36. One of the upper gears is driven by a motor 38.

The sheet of filter medium is comprised of a filter paper or a woven material will allow passage of the liquid through it but filter out particles contaminating the liquid. It is fed from a roll of filter medium paper 40 and directed onto the conveyor 12 by guide 42. After passing through the pool of contaminated liquid, the sheet 20 will leave the path of the conveyor 12 as the conveyor starts its downward path and the used sheet of filter paper will be collected for disposal in a waste container 44.

The conveyor on its upper run is supported by the upper portion 46 of the compartment 14 which holds the filtered liquid until it reaches the opening 48 which leads to compartment. While it passes over the opening, the conveyor is supported by shelves 50 on each sides of the opening parallel to the direction of the movement of the filter medium sheet. It is also supported by periodic groups of rollers 52 or any other porous support means. These support means should be spaced so that the bottom of the flat wire belt sealably slides along the shelf 50 so to prevent liquid from flowing under the belt and should give sufficient support to prevent excessive drag by the belt as it moves over the shelves. There is also provided additional rollers 54 on the lower run of the conveyor to ease the movement of the conveyor in that area of its travels.

The filter operates in the following manner: There is created a partial vacuum within the compartment 14 which will contain the filtrate 16 by means of an air pump 56 which communicates with the compartment at opening 58. Liquid is fed onto the conveyor through pipe 60 from a source of contaminated liquid (not shown) and collected in a pool 18 above the conveyor 12 and sheet of filter medium 20. It flows through the filter medium as shown in FIGS. 1 and 2, and through the conveyor into the compartment holding the clean liquid for filter. The filter is then removed from the compartment through outtake pipe 62.

Due to the enlarged holes 28 around the rods connecting the flat metal pieces comprising the flat wire belt, the partial vacuum created in chamber 14 is communicated throughout the flat wire belt. This, in turn, pulls the sheet of filter medium against the top of the conveyor in a sealing relationship. Thus liquid cannot enter the compartment holding the clean liquid through the top of the conveyor without passing through the filter medium. It is prevented from flowing under the conveyor by a sliding relationship between the belt and the shelves which prevents liquid from flowing under the belt. Preferably the filter medium paper will be extended over the sides of the conveyor. The tie rod holes in the side of the conveyor are not completely sealed by the cap 30, so that the partial vacuum will hold the filter paper in place along the sides while it passes through the pool of contaminated liquid, as best shown in FIG. 7.

The enlarged holes 28 also will provide a path through which the filtered liquid 16 can reach the opening 48 to the filtrate compartment 14. It should be noted that although I provide enlarged holes around the rods as the way in which the vacuum is communicated through the conveyor, it may also be done through additional holes in the flat metal pieces other than those made for placement of the rod.

To assist in forming a seal between the sheet of filter medium 20 and the sides of the conveyor 66, I have included filter medium guides 42 located adjacent the sides of the conveyor. These guides are bars 70 that include a beveled lead-in portion 68. In operation of the filter a portion 72 of the filter medium sheet extends over the edges 74 of the conveyor. When the filter medium sheet is first positioned it is bent downward along the filter medium guide 42 as shown best in FIGS. 7 and 8. The partial vacuum communicated under the conveyor holds the portion of the sheet of filter medium from its folded down position (shown by dotted lines in FIG. 7) into a sealing position over the holes 64 in the sides of the conveyor (as shown by the solid lines in FIG. 7). When the conveyor moves unfolded sections will contact the lead-in portion 68 and be bent downward so as to approach the sides of the conveyor and be pulled into a sealing position.

What is claimed is:

1. A liquid filter comprising, in combination:
   a conveyor;
   means cooperating with the conveyor to allow formation of a pool of a liquid to be filtered above the conveyor;
   a sheet of filter medium supported by the conveyor when passing through the pool;
   a compartment for collecting the filtrate obtained when the liquid passes through the filter medium;
   means for inducing a partial vacuum in the compartment;
   means for communicating the partial vacuum throughout the conveyor under the filter medium;
   the filter medium when passing through the pool mechanically unrestrained with respect to movement away from the conveyor and responsive to the partial vacuum in the conveyor so as to be pulled against the conveyor in a sealing relation; and
   a filter medium guide with lead-in means positioned for directing and folding a portion of the sheet sufficiently proximate with a side of the conveyor having holes communicating with the filtrate compartment so to enable the portion to seal the holes in response to the partial vacuum within the compartment.

2. The filter as recited in claim 1 wherein the filter medium guide comprise a bar with a bevel portion located along the path of the conveyor where the pool begins.

* * * * *